United States Patent [19]

Renner

[11] 3,931,063

[45] Jan. 6, 1976

[54] PROCESS FOR THE MANUFACTURE OF POROUS SOLIDS CONSISTING OF CROSSLINKED UREA-FORMALDEHYDE POLYCONDENSATION PRODUCTS

[75] Inventor: Alfred Renner, Muenchenstein, Switzerland

[73] Assignee: Ciba-Geigy AG, Basel, Switzerland

[22] Filed: Mar. 14, 1974

[21] Appl. No.: 451,380

Related U.S. Application Data

[63] Continuation-in-part of Ser. No. 383,696, July 30, 1973, abandoned, which is a continuation of Ser. No. 65,329, Aug. 19, 1970, abandoned.

[52] U.S. Cl. ............ 260/2.5 F; 260/15; 260/29.4 R; 260/69 R; 260/71
[51] Int. Cl.² ........................ C08J 9/00; C08L 1/26
[58] Field of Search ....... 260/69, 70, 71, 29.4, 29.3, 260/15, 2.5 F

[56] References Cited
UNITED STATES PATENTS

| | | | |
|---|---|---|---|
| 3,553,115 | 1/1971 | Curchod et al. | 260/3 |
| 3,712,879 | 1/1973 | Strickrodt et al. | 260/69 |

FOREIGN PATENTS OR APPLICATIONS

| | | | |
|---|---|---|---|
| 1,239,143 | 7/1971 | United Kingdom | 260/15 |

OTHER PUBLICATIONS

South African Patent Abstract–69/1862, Sept. 17, 1969; (South African Pat. Journal–Oct. 69, p. 199.

Die Makromolekulare Chemie, Band 149, 1971, Seite 1–27, Alfred Renner, "Kondensations Polymere—Harnstoff—Formaldehyde-Oberflache".

*Primary Examiner*—Donald E. Czaja
*Assistant Examiner*—Edward Woodberry
*Attorney, Agent, or Firm*—Wenderoth, Lind & Ponack

[57] ABSTRACT

To manufacture porous solids, possessing an internal surface area of more than 10 m²/g of crosslinked urea-formaldehyde polycondensation products, an aqueous solution of urea and formaldehyde or of a precondensate of urea and formaldehyde is adjusted to a pH value of 0 to 4 by adding a Brönsted acid having a dissociation constant of not less than $1\times10^{-6}$, for example sulphamic acid or a water-soluble ammonium hydrogen sulphate, so that an insoluble and infusible precipitate consisting of polymeric condensation product is formed, in the course of which the molar ratio of formaldehyde: urea should be at least 0.5 and at most 1.2 not later than at the time of precipitation. The resulting precipitate is separated off, dried and ground. The powder is suitable for use as an absorbent, for example for effluent purification, or as a white pigment.

13 Claims, No Drawings

PROCESS FOR THE MANUFACTURE OF POROUS SOLIDS CONSISTING OF CROSSLINKED UREA-FORMALDEHYDE POLYCONDENSATION PRODUCTS

This application is a continuation-in-part of application Ser. No. 383,696 filed July 30, 1973 (now abandoned) which application is in turn a continuation of application Ser. No. 65,329, filed Aug. 19, 1970 (now abandoned).

The present invention provides a process for the manufacture of porous solids having an internal surface area greater than 10 m²/g of crosslinked urea-formaldehyde polycondensation products, which is characterised in that an aqueous solution or urea and formaldehyde, or of a precondensate of urea and formaldehyde, is adjusted to a pH value of 0 to 4 by adding a Brönsted acid having a dissociation constant of not less than 1×10⁻⁶, so that an insoluble and infusible precipitate consisting of polymeric condensation product is formed, with the molar ratio of formaldehyde:urea being at least 0.5 and at most 1.2, preferably at least 0.5 and at most 1.0, not later than at the time of precipitation, and that the resulting precipitate is separated off and dried.

As examples of Brönsted acids having a dissociation constant 10⁻⁶ there may be mentioned: formic acid, acetic acid, chloracetic acids, acrylic acid, oxalic acid, malonic acid, maleic acid, tartaric acid, citric acid, sulphurous acid, nitric acid, phosphoric acid, sulphuric acid and hydrochloric acid. The strong acids, such as nitric acid, sulphuric acid and hydrochloric acid can also be employed in the form of their ammonium salts or amine salts or in the form of mixtures of these salts with the free acids.

Particularly suitable substances are sulphamic acid (amindosulphonic acid $H_2N-SO_3H$), and also water-soluble ammonium hydrogen sulphates of general formula $$[R-NH_3]^+ \cdot [SO_4H]^- \qquad I$$

wherein R denotes a hydrogen atom or an organic radical which does not impair the solubility in water, such as especially an alkyl, cycloalkyl, hydroxyalkyl, aralkyl or aryl radical.

Examples of such optionally substituted ammonium hydrogen sulphates of formula (I) are, in addition to $NH_4^+ \cdot HSO_4^-$, $CH_3-NH_3^+ \cdot HSO_4^-$; $C_2H_5NH_3^+ \cdot HSO_4^-$; $HO-CH_2CH_2-NH_3^+ \cdot HSO_4$;

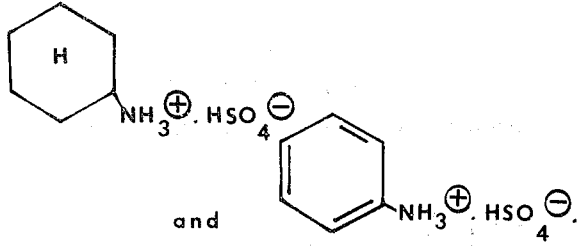

and

Where the basicity of the amine component is too great, some excess of strong acid e.g. sulphuric acid is appropriately added to the ammonium salt solution. The formation of the insoluble precipitate of polymeric formaldehyde-urea condensation product can be carried out in the presence of surface-active substances (detergents) or of protective colloids. In some cases these result in an increase in the specific surface area. The surface-active substance can be either ionic or non-ionic. As ionic representatives of this class of substances there may for example be mentioned: cationic quaternary ammonium bases or anionic fatty alcohol sulphates or sulphonates, alkylarylsulphonates, salts of sulphosuccinic acid esters, and monoglyceride sulphates, and as non-ionic representatives polyglycol ethers of fatty alcohols or alkylphenols may for example be mentioned. Protective colloids are, in this context, understood as water-soluble macromolecular substances which greatly increase the viscosity of aqueous solutions. Typical representatives of this class of compound are the sodium salt of carboxymethylcellulose, methyl-, ethyl- and β-hydroxyethyl-cellulose, polyvinyl alcohol, water-soluble polymers and copolymers of acrylic acid or of methacrylic acid. The concentrations at which surface-active substances and/or protective colloids display their best effect depend on the chemical structure and molecular weight of the substances. They are generally active in amounts of between 0.1 and 10% by weight, preferably between 0.5 and 5% by weight, relative to the weight of urea and formaldehyde.

Numerous embodiments of the process according to the invention can be carried out: appropriately, an aqueous solution which contains urea and formaldehyde in the requisite molar ratio or contains a precondensate of the two components, is mixed with the aqueous acid solution at temperatures of between room temperature and 100°C. The aqueous solution of the precondensate is as a rule prepared in the pH range of between 6 and 9 and in the temperature range of between 40° and 100°C. The reaction time should appropriately be so long that the bulk of the formaldehyde (about 90%) has the opportunity to react with the urea, but not so long that the compatibility with water of the precondensate becomes so low that it can no longer be homogeneously mixed with the acid solution. Relatively high temperatures and relatively low pH values lead to the desired degree of polycondensation within a shorter time. If desired, a precondensate of urea and less than the total amount of $CH_2O$ employed can first be manufactured, and the remaining quantity of formaldehyde only added during the subsequent precipitation.

The surface-active substance and/or the protective colloid can be present in one of the two aqueous solutions, or in both aqueous solutions. Acid-sensitive substances are better added to the urea-formaldehyde solution. The two solutions can be mixed by adding one of the solutions dropwise to the other whilst stirring. It is however, also possible rapidly to mix the two solutions with one another and to leave them standing at an elevated temperature to continue reacting.

For most end uses it is advantageous, but not essential, to neutralize the polymer precipitate. NaOH, KOH, Ca(OH)₂ and aqueous ammonia are suitable for this purpose. Washing of the polymeric precipitate is in most cases not necessary. The drying is best carried out in a hot stream of air. In the case of short contact times, very high drying temperatures (up to 500°C) can be used. For some end uses it is advantageous to comminute the dried process product. Pin mills, hammer mills, cross-beater mills, air jet mills and ball mills are suitable for this purpose. The products of the process do not consist of non-porous but of porous more or less agglomerated individual particles. The size of these agglomerates is determined by the mechanical comminution process. The size of the individual particles is not significantly less than 1 micron. Since the specific surface area is up to 300 m²/g the bulk part of the surface is the internal surface area, which exists in the form of pores, grooves and internal cavities. The formaldehyde to urea ratio in the final products will vary with the ratio employed in the process. When the ratio employed in the process is 0.5 the ratio in the final product is 0.8. As the ratio utilized in the process increases up to 1.0 the ratio in the final product increases up to 1.0.

As used herein the term "insoluble" means that the products are not soluble in the conventional organic polymer solvents such as for example alcohols, ethers, ketones, hydrocarbons and the like. The products of the invention melt only under conditions of decomposition and are thus designated herein as "infusible".

Because of this structure and the magnitude of the internal surface area, these polymers are suitable for use as adsorbents, for example for off gas and effluent purification. They are furthermore suitable for use as white pigments.

In the examples which follow, parts denote parts by weight and percentages denote percentages by weight.

EXAMPLE 1

500 parts of 30% strength aqueous formaldehyde solution are adjusted to pH=7 with dilute sodium hydroxide solution and warmed to 50°C. 300 parts of urea are added and condensation is carried out for 3 hours at pH=7 and 50°C.

The resulting solution of the precondensate is rapidly added dropwise, whilst stirring, to a solution of the following composition, warmed to 70°C:
  16 parts of sulphamic acid,
  50 parts of aqueous 30% strength formaldehyde solution, and
  1705 parts of deionised water.

During the dropwise addition of the solution of the precondensate, a polymer precipitate forms. At the end of the dropwise addition, the pH value is 1.5. The mixture is allowed to continue to react for 6 hours at 70°C whilst stirring and is neutralized with a 10% strength aqueous Na$_2$CO$_3$ solution in a stirred flask, and the product is centrifuged off, washed with water, dried for 24 hours at 80°C and ground for 2 hours in a stoneware ball mill.

353 parts (corresponding to a yield of 1.17 kg per 1 kg of urea employed) of a white free-flowing powder with a specific surface area of 118 m$^2$/g are obtained. The mean agglomerate size of the product is about 13 microns, the molar ratio F/U in the product =1.05.

EXAMPLES 2 – 6

Exactly the same procedure as in Example 1 is followed except that the solution of the precondensate is added dropwise to an aqueous solution which, in addition to 16 parts of sulphamic acid, 50 parts of aqueous 30% strength CH$_2$O and 1705 parts of deionized water, also contains 9 parts of one of the surface-active substances or protective colloids indicated in Table 1 below.

Yields and properties of the free-flowing powders obtained as end products are recorded in Table 1 below:

Table 1

| Ex. | Parts | Surface-active substance or protective colloid | F/U in the product | Yield Parts | kg per 1 kg of urea | Specific surface area m$^2$/g | Mean agglomerate size micron |
|---|---|---|---|---|---|---|---|
| 2 | 9.0 | Na-lauryl sulphate | 0.98 | 313 | 1.04 | 284 | 8 |
| 3 | 9.0 | C$_{17}$H$_{33}$CO; NH(CH$_2$)$_3$N(CH$_3$)$_2$ | 1.0 | 331 | 1.115 | 244 | 10 |
| 4 | 9.0 | Wetting agent from Example 3. quaternized with dimethylsulphate | 0.97 | 327 | 1.09 | 285 | 15 |
| 5 | 9.0 | Na-carboxymethyl-cellulose | 0.95 | 347 | 1.155 | 258 | 15 |
| 6 | 9.0 | Polyvinyl alcohol | 0.98 | 337 | 1.12 | 302 | — |

EXAMPLE 7

A precondensate solution, which is manufactured according to the data of Example 1, is added dropwise whilst stirring, at 70°C, to a solution of 25 parts of sulphuric acid in 1425 parts of water. A precipitate immediately forms. When all the precondensate has been introduced, the pH value is 1.2. After continuing to react for 6 hours at 70°C, the mixture is cooled to room temperature and rendered neutral, and the product is filtered off, dried for 24 hours at 120° in a stream of air and ground in a high speed pin mill.

352 parts (corresponding to a yield of 1.17 kg per 1 kg of urea employed) of a white, free-flowing powder with the following properties are obtained:

| | |
|---|---|
| Specific surface area | 252 m$^2$/g |
| Bulk density: | 273 g/liter |
| Volatile constituents: | 6.9% |
| F/U: | 0.98. |

EXAMPLE 8

A solution of the following composition is prepared:

| | |
|---|---|
| Deionised H$_2$O: | 1700 parts |
| Na lauryl-sulphate: | 11.76 parts |
| 30% strength formaldehyde: | 560 parts |
| Urea: | 420 parts. |

The pH is adjusted to 7 with aqueous sodium hydroxide solution and condensation is carried out for 3 hours at pH and 70°C.

A solution of 88.5 parts of oxalic acid dihydrate in 160 parts of water is added dropwise whilst stirring, to the resulting precondensate solution. A polymer precipitate forms. The subsequent reaction and working up take place exactly as in Example 7.

418 parts (corresponding to a yield of 0.99 kg per 1 kg of urea employed) of a white, free-flowing powder with the following properties are obtained:

| | |
|---|---|
| Specific surface area: | 177 m²/g |
| Bulk density: | 198 g/liter |
| Volatile constituents: | 1.5% |
| Mean agglomerate size: | 10 micron |
| F/U: | 0.90 | can be seen from the Table below, are in each case condensed for 3 hours at 70°C and pH=7.

Each individual precondensate is mixed, at 50°C, with a solution of 16 parts of sulphamic acid in 100 parts of $H_2O$. The subsequent reaction and working up of the reaction mixture takes place exactly as described for Examples 9 – 14. The material is however, only ground once in the pin mill. The batches, yields and properties of the end products are given in Table 3 below:

Table 3

| Example No. | 15 | 16 | 17 | 18 |
|---|---|---|---|---|
| Batch: | | | | |
| Deionized water | 1325 | 575 | 200 | — |
| Na-dodecylbenzenesulphonate | 9.0 | 9.0 | 9.0 | 9.0 |
| 30% strength formaldehyde solution | 500 | 500 | 500 | 500 |
| Urea | 300 | 300 | 300 | 300 |
| Concentration (%) | 20 | 30 | 40 | 50 |
| Yield   Parts | 361 | 348 | 361 | 352 |
| kg/kg Urea | 1.2 | 1.16 | 1.20 | 1.17 |
| Specific surface area (m²/g) | 107.4 | 103.2 | 161.5 | 161.3 |
| Bulk density (g/liter) | 284 | 283 | 250 | 223 |
| Volatile constituents in the end product (%) | 4.5 | 4.2 | 6.5 | 5.9 |
| Molar ratio F/U in the product | 0.98 | 0.97 | 1.01 | 0.99 |
| Mean agglomerate size ($\mu$) | 8 | 11 | 15 | 15 |

EXAMPLES 9 – 14

The following series of experiments shows the influence of the molecular ratio of $CH_2O$ : urea in the operative range according to the invention on the specific surface area of the end products; the batches for the precondensate solutions, the composition of which can be seen from Table 2 below, are in each case condensed for 3 hours at 70°C and pH=7. Each precondensate solution is rapidly mixed with a solution of 14.55 parts of sulphamic acid in 283.5 parts of water at 50°C. In the course thereof, the temperature rises to 65°–70°C. The reaction mixture is left for 3 hours at this temperature, stirred up with water, and neutralized to pH=7.5 with 10% strength aqueous sodium carbonate solution, and the product is filtered off, dried at 120°C and ground on a pin mill (3 passes). The batches, yields and properties of the end products are indicated in Table 2 below:

EXAMPLE 19

This Example describes a test according to the invention. The molar ratio of formaldehyde to urea in the reaction mixture is 1.0. However, the reaction condition does not lead to an optimum of the specific surface area because the product is obtained according to an Aminoplast-R-type process (U.S. Pat. No. 3,553,115). That means monobasic monoethanolamine phosphates are present in the reaction mixture.

A powder with a specific surface area of 22.9 m²/g is obtained.

EXAMPLE 20

This is an Example according to the invention using a molar ratio F/U of 1.0 and 2 % of Na-carboxymethylcellulose as a protective colloid in the reaction mixture. A powder with a specific surface area of 283 m²/g is obtained.

Table 2

| Example No. | 9 | 10 | 11 | 12 | 13 | 14 |
|---|---|---|---|---|---|---|
| Batch: | | | | | | |
| Deionized water | 275.5 | 280 | 283.5 | 283.5 | 287 | 290 |
| Na-dodecylbenzenesulphonate | 4.5 | 4.8 | 4.95 | 5.04 | 5.2 | 5.4 |
| 30% strength formaldehyde solution | 150 | 198 | 225 | 240 | 270 | 290 |
| Urea | 180 | 180 | 180 | 180 | 180 | 180 |
| Molar ratio $CH_2O$/urea | 0.5 | 0.66 | 0.75 | 0.8 | 0.9 | 1.0 |
| Yield   Parts | 106 | 146 | 170 | 175 | 192 | 208 |
| kg per 1 kg of urea | 0.59 | 0.81 | 0.95 | 0.97 | 1.07 | 1.15 |
| Specific surface area (m²/g) | 31.7 | 90 | 92.4 | 153 | 138 | 171 |
| Bulk density (g/liter) | 205 | 203 | 205 | 215 | 247 | 253 |
| Volatile constituents in the end product (%) | 2.70 | 2.0 | 4.6 | 2.8 | 3.2 | 3.3 |
| Molar ratio F/U in the product | 0.78 | 0.85 | 0.88 | 0.90 | 0.96 | 1.0 |
| Mean agglomerate size ($\mu$) | — | — | — | — | 7 | 6 |

EXAMPLES 15 – 18

The following series of experiments shows the influence of the concentration of the polymer-forming agents during the precipitation on the properties of the porous urea-formaldehyde polymers. The batches for the precondensate solutions, the composition of which

What is claimed is:

1. A process for the manufacture of porous more or less agglomerated individual particles of crosslinked urea-formaldehyde polycondensation products having an internal surface area greater than 10 m²/g and having a tendency to become agglomerated which comprises forming an aqueous solution of urea and formaldehyde or of a precondensate of urea and formaldehyde, adjusting the pH of the resulting solution at a temperature of between room temperature and 100°C to a pH value of 1.2– 1.5 by adding a Brönsted acid having a dissociation constant of not less than $1 \times 10^{-6}$ so as to form a precipitate, the molar ratio of formaldehyde:urea being at least 0.5 and at most 1.0 not later than at the time of precipitation, separating off the resultant precipitate and drying.

2. A process as claimed in claim 1, wherein sulphamic acid or a water-soluble ammonium hydrogen sulphate of formula

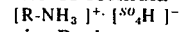

wherein R denotes a hydrogen atom or an organic radical, which does not impair the solubility in water, selected from the group consisting of alkyl, cycloalkyl, hydroxylalkyl, aralkyl and aryl, is used as the Brönsted acid.

3. A process as claimed in claim 1, wherein the aqueous solution of a precondensate, which has been manufactured by precondensation of the reaction components in the pH range of 6 to 9 and in the temperature range of 40°–100°C, is used.

4. A process as claimed in claim 1, wherein the aqueous solution of a precondensate, which has been obtained by reaction of the reaction components over a period of time so chosen that whilst the bulk of the formaldehyde has reacted with the urea, the compatibility with water of the precondensate is still sufficiently great to permit it to be homogeneously mixed with an aqueous solution of the Brönsted acid, is used.

5. A process as claimed in claim 1, wherein the precipitation is carried out in the presence of a surface-active substance or of a protective colloid.

6. A process as claimed in claim 5, wherein the surface-active substance or the protective colloid is employed in an amount of 0.1 to 10% by weight relative to the weight of urea and formaldehyde.

7. A process as claimed in claim 5, wherein the surface-active substance or the protective colloid is employed in an amount of 0.5 to 5% by weight relative to the weight of urea and formaldehyde.

8. A process as claimed in claim 5, wherein a member selected from the group consisting of a cationic quaternary ammonium base, an anionic fatty alcohol sulphate or sulphonate, an alkylarylsulphonate, a non-ionic polyglycol ether of fatty alcohol and an alkyl phenol, is used as the surface-active substance.

9. A process as claimed in claim 5, wherein a member selected from the group consisting of sodium carboxymethylcellulose, methyl-, ethyl- or hydroxyethyl-cellulose, a polyvinyl alcohol and a water-soluble polymer or copolymer of acrylic or methacrylic acid is used as a protective colloid.

10. A process as claimed in claim 1, wherein the precipitation is carried out by mixing the aqueous solution of the precondensate with an aqueous solution of the Brönsted acid in the temperature range of 20°–100°C.

11. A process as claimed in claim 1, wherein the precipitation is carried out by mixing the aqueous solution of the precondensate with an aqueous solution of the Brönsted acid in the temperature range of 30°–70°C.

12. A process as claimed in claim 1 wherein the dry polycondensation product is ground by means of a high-speed pin mill.

13. A porous, insoluble, infusible cross-linked urea-formaldehyde polycondensation product in the form of individual particles having an internal surface area greater than 10 m²/g and having a tendency to become agglomerated wherein the molar ratio of formaldehyde:urea ranges from 0.8 to 1.0.

* * * * *